(12) United States Patent
Gardner et al.

(10) Patent No.: US 9,547,780 B2
(45) Date of Patent: Jan. 17, 2017

(54) METHOD FOR DETERMINING IDENTIFICATION OF AN ELECTRONIC DEVICE

(75) Inventors: Philip B. Gardner, Woodbury, MN (US); Victor Volodarets, New Westminster (CA)

(73) Assignee: ABSOLUTE SOFTWARE CORPORATION, Vancouver (CA)

( * ) Notice: Subject to any disclaimer, the term of this patent is extended or adjusted under 35 U.S.C. 154(b) by 859 days.

(21) Appl. No.: 11/726,352

(22) Filed: Mar. 20, 2007

(65) Prior Publication Data

US 2007/0234427 A1   Oct. 4, 2007

Related U.S. Application Data

(60) Provisional application No. 60/784,195, filed on Mar. 20, 2006.

(51) Int. Cl.
  *G06F 21/73*   (2013.01)
  *G06F 21/88*   (2013.01)

(52) U.S. Cl.
  CPC .............. *G06F 21/73* (2013.01); *G06F 21/88* (2013.01)

(58) Field of Classification Search
  CPC ............................... G06F 21/73; G06F 21/88
  USPC ........................................................ 709/224
  See application file for complete search history.

(56) References Cited

U.S. PATENT DOCUMENTS

| | | | |
|---|---|---|---|
| 3,357,020 A | 12/1967 | Slifer, Jr. | |
| 3,568,161 A | 3/1971 | Knickel | |
| 3,665,312 A | 5/1972 | Jarvis | |
| 3,694,579 A | 9/1972 | McMurray | |
| 3,824,469 A | 7/1974 | Ristenbatt | |
| 3,925,763 A | 12/1975 | Wadhwani | |
| 3,987,246 A | 10/1976 | Willis | |
| 4,006,460 A | 2/1977 | Hewitt | |
| 4,020,477 A | 4/1977 | Holland | |
| 4,023,163 A | 5/1977 | Krishnaiyer | |
| 4,068,105 A | 1/1978 | Jain | |
| 4,187,497 A | 2/1980 | Howell et al. | |
| 4,228,424 A | 10/1980 | Le Nay | |

(Continued)

FOREIGN PATENT DOCUMENTS

| | | |
|---|---|---|
| CA | 2036131 | 8/1992 |
| EP | 0588519 | 3/1994 |

(Continued)

OTHER PUBLICATIONS

Microsoft Computer Dictionary $5^{th}$ Ed. 2002. p. 363.*

(Continued)

*Primary Examiner* — Kari Schmidt
(74) *Attorney, Agent, or Firm* — Liu & Liu

(57) ABSTRACT

A utility to determine identity of an electronic device electronically, by running a device attribute collection application that collects key data points of the electronic devices and a device identification application that uses these key data points to link the electronic device to a specific owner or entity. Data points of the device may change over time for reasons such as reconfiguration, repair or normal daily use. The device identification application intelligently and consistently tracks changes in key data points associated with the device, even if the data points change over its lifecycle. The device may be identified remotely with the device identification application (e.g., in the event of theft or loss of the device) based on the collected data points. The device identification application may be deployed in conjunction with services that may include asset tracking, asset recovery, data delete, software deployment, etc.

13 Claims, 4 Drawing Sheets

(56) References Cited

U.S. PATENT DOCUMENTS

| | | | |
|---|---|---|---|
| 4,284,985 A * | 8/1981 | Heger et al. ............... | 340/572.3 |
| 4,375,637 A | 3/1983 | Desjaridins | |
| 4,465,904 A | 8/1984 | Gottsegen | |
| 4,562,572 A | 12/1985 | Goldman et al. | |
| 4,577,182 A | 3/1986 | Millsap | |
| 4,596,988 A | 6/1986 | Wanka | |
| 4,651,157 A | 3/1987 | Gray et al. | |
| 4,652,859 A | 3/1987 | Van Wienen | |
| 4,689,786 A | 8/1987 | Sidhu | |
| 4,692,742 A | 9/1987 | Raizen | |
| 4,696,027 A | 9/1987 | Bonta | |
| 4,703,324 A | 10/1987 | White | |
| 4,728,935 A | 3/1988 | Pantus | |
| 4,742,357 A | 5/1988 | Rackley | |
| 4,754,261 A | 6/1988 | Marino | |
| 4,818,998 A | 4/1989 | Apsell et al. | |
| 4,819,053 A | 4/1989 | Halavais | |
| 4,855,906 A | 8/1989 | Burke | |
| 4,875,208 A | 10/1989 | Furuhashi | |
| 4,891,650 A | 1/1990 | Sheffer | |
| 4,908,629 A | 3/1990 | Apsell et al. | |
| 4,926,162 A | 5/1990 | Pickell | |
| 4,935,951 A | 6/1990 | Robinson et al. | |
| 4,949,248 A | 8/1990 | Caro | |
| 4,951,029 A | 8/1990 | Severson | |
| 4,972,367 A | 11/1990 | Burke | |
| 4,996,524 A | 2/1991 | Tojima | |
| 4,999,621 A | 3/1991 | Loeb | |
| 5,003,317 A | 3/1991 | Gray et al. | |
| 5,043,736 A | 8/1991 | Darnell | |
| 5,055,851 A | 10/1991 | Sheffer | |
| 5,077,788 A | 12/1991 | Cook et al. | |
| 5,210,748 A | 5/1993 | Onishi | |
| 5,218,367 A | 6/1993 | Sheffer | |
| 5,223,844 A | 6/1993 | Mansell et al. | |
| 5,272,465 A | 12/1993 | Meares | |
| 5,287,505 A | 2/1994 | Calvert et al. | |
| 5,351,237 A | 9/1994 | Shinohara | |
| 5,355,371 A | 10/1994 | Auerbach et al. | |
| 5,355,487 A | 10/1994 | Keller | |
| 5,363,369 A | 11/1994 | Hemmady | |
| 5,406,269 A | 4/1995 | Baran | |
| 5,410,543 A | 4/1995 | Seitz | |
| 5,465,330 A | 11/1995 | Komatsu | |
| 5,479,482 A | 12/1995 | Grimes | |
| 5,483,244 A | 1/1996 | Grube | |
| 5,511,109 A | 4/1996 | Hartley et al. | |
| 5,515,419 A | 5/1996 | Sheffer | |
| 5,537,460 A | 7/1996 | Holliday, Jr. et al. | |
| 5,548,637 A | 8/1996 | Heller et al. | |
| 5,566,339 A | 10/1996 | Perholtz et al. | |
| 5,576,716 A | 11/1996 | Sadler | |
| 5,583,517 A | 12/1996 | Yokev et al. | |
| 5,588,005 A | 12/1996 | Ali et al. | |
| 5,598,456 A | 1/1997 | Feinberg | |
| 5,602,739 A | 2/1997 | Haagenstad et al. | |
| 5,635,924 A | 6/1997 | Tran et al. | |
| 5,644,782 A | 7/1997 | Yeates et al. | |
| 5,655,081 A | 8/1997 | Bonnell et al. | |
| 5,680,547 A | 10/1997 | Chang | |
| 5,682,139 A | 10/1997 | Pradeep | |
| 5,708,417 A | 1/1998 | Tallman et al. | |
| 5,715,174 A | 2/1998 | Cotichini et al. | |
| 5,729,596 A | 3/1998 | Reeder et al. | |
| 5,737,391 A | 4/1998 | Dame | |
| 5,748,084 A | 5/1998 | Isikoff | |
| 5,754,111 A | 5/1998 | Garcia | |
| 5,764,892 A | 6/1998 | Cain et al. | |
| 5,768,513 A | 6/1998 | Kuthyar | |
| 5,771,484 A | 6/1998 | Tognazzini | |
| 5,778,367 A | 7/1998 | Wesinger, Jr. et al. | |
| 5,783,989 A | 7/1998 | Issa et al. | |
| 5,802,280 A | 9/1998 | Cotichini et al. | |
| 5,818,335 A | 10/1998 | Rinsch et al. | |
| 5,826,025 A | 10/1998 | Gramlich | |
| 5,835,087 A | 11/1998 | Herz et al. | |
| 5,835,896 A | 11/1998 | Fisher et al. | |
| 5,838,916 A | 11/1998 | Domenikos et al. | |
| 5,848,373 A | 12/1998 | DeLorme et al. | |
| 5,848,413 A | 12/1998 | Wolff | |
| 5,877,969 A | 3/1999 | Gerber | |
| 5,896,497 A | 4/1999 | Halstead | |
| 5,912,888 A | 6/1999 | Walsh | |
| 5,923,731 A | 7/1999 | McClure | |
| 5,996,011 A | 11/1999 | Humes | |
| 6,031,894 A * | 2/2000 | Fleming, III ................. | 379/44 |
| 6,032,257 A * | 2/2000 | Olarig et al. ................. | 726/35 |
| 6,038,602 A | 3/2000 | Ishikawa | |
| 6,061,505 A | 5/2000 | Pitchaikani | |
| 6,075,451 A | 6/2000 | Lebowitz | |
| 6,101,499 A | 8/2000 | Ford | |
| 6,208,670 B1 | 3/2001 | Milliron | |
| 6,233,536 B1 | 5/2001 | Zale et al. | |
| 6,244,758 B1 * | 6/2001 | Solymar et al. ............. | 709/224 |
| 6,269,392 B1 * | 7/2001 | Cotichini et al. ........... | 709/200 |
| 6,282,574 B1 | 8/2001 | Voit | |
| 6,300,863 B1 * | 10/2001 | Cotichini et al. ............. | 340/5.8 |
| 6,380,860 B1 | 4/2002 | Goetz | |
| 6,477,667 B1 | 11/2002 | Levi et al. | |
| 6,504,479 B1 | 1/2003 | Lemons | |
| 6,507,914 B1 | 1/2003 | Cain et al. | |
| 6,636,983 B1 | 10/2003 | Levi | |
| 6,658,585 B1 | 12/2003 | Levi | |
| 6,658,586 B1 | 12/2003 | Levi | |
| 6,826,611 B1 | 11/2004 | Arndt | |
| 6,833,787 B1 | 12/2004 | Levi | |
| 6,947,978 B2 | 9/2005 | Huffman | |
| 6,950,946 B1 * | 9/2005 | Droz et al. ................... | 726/35 |
| 7,237,267 B2 * | 6/2007 | Rayes et al. ................. | 726/25 |
| 7,278,131 B2 | 10/2007 | Gunyakti et al. | |
| 7,302,590 B2 | 11/2007 | Dublish et al. | |
| 7,409,219 B2 * | 8/2008 | Levitan ...................... | 455/456.6 |
| 7,509,116 B2 * | 3/2009 | Fan et al. ..................... | 455/405 |
| 2002/0055848 A1 | 5/2002 | Jae et al. | |
| 2002/0112052 A1 * | 8/2002 | Brittingham et al. ........ | 709/224 |
| 2003/0051090 A1 | 3/2003 | Bonnett et al. | |
| 2003/0153328 A1 | 8/2003 | Booth et al. | |
| 2004/0031030 A1 * | 2/2004 | Kidder ...................... | G06F 1/14 |
| | | | 717/172 |
| 2004/0122931 A1 | 6/2004 | Rowland et al. | |
| 2005/0086502 A1 * | 4/2005 | Rayes et al. .................. | 713/189 |
| 2005/0114234 A1 | 5/2005 | Thomas et al. | |
| 2005/0204162 A1 * | 9/2005 | Rayes et al. .................. | 713/201 |
| 2005/0256973 A1 | 11/2005 | Holtz et al. | |
| 2006/0026604 A1 | 2/2006 | Tan et al. | |
| 2006/0276175 A1 * | 12/2006 | Chandran ..................... | 455/411 |
| 2007/0072620 A1 * | 3/2007 | Levitan ...................... | 455/456.1 |
| 2013/0198522 A1 * | 8/2013 | Kohno ..................... | G06F 21/62 |
| | | | 713/182 |

FOREIGN PATENT DOCUMENTS

| | | |
|---|---|---|
| EP | 0740037 | 10/1996 |
| JP | 62-047762 | 3/1987 |
| JP | 04-086564 | 7/1992 |
| JP | 06-188829 | 7/1994 |
| WO | 96/03728 | 2/1996 |
| WO | 96/15485 | 5/1996 |
| WO | 01/25923 | 4/2001 |
| WO | 01/25998 | 4/2001 |
| WO | 01/84455 | 11/2001 |
| WO | 2005/096122 | 10/2005 |
| WO | 2006089352 | 8/2006 |

OTHER PUBLICATIONS

Kezunovi, Mladen, Tanja Djoki, and Tatjana Kosti. "Automated monitoring and control using new data integration paradigm." Proceedings of the 38th Annual Hawaii International Conference on System Sciences. IEEE, 2005. (pp. 1-10).*

Ford, Bryan, et al. "Persistent personal names for globally connected mobile devices." Proceedings of the 7th symposium on

(56) References Cited

OTHER PUBLICATIONS

Operating systems design and implementation. USENIX Association, 2006.(pp. 233-248).*
Mainwaring, Jon, "Virus Fights Laptop Crime", http://www.electronicsweekly.com/Articles/1997/02/12/2706/virus-fights-laptop-crime.htm, Feb. 12, 1997.
Bernhardt, Cecile, "Anti-Theft—PC Phone Home Device for Laptops", Infomatics, Computing.co.uk, Feb. 11, 1997.
International Search Report of Related PCT Application No. PCT/US2006/010381.

* cited by examiner

METHOD FOR DETERMINING IDENTIFICATION OF AN ELECTRONIC DEVICE

This application claims the priority of U.S. Provisional Application No. 60/784,195, filed Mar. 20, 2006. This document and other publications referenced herein are fully incorporated by reference as if fully set forth herein.

BACKGROUND OF THE INVENTION

1. Field of the Invention

The present invention relates to identification of an electronic device electronically by remote access.

2. Description of Related Art

In today's competitive business environment, information technology (IT) is playing an increasingly important role in the exchange of knowledge in day-to-day business as well as personal functions. Individuals, systems, organizations, and other business assets are interconnected in this emerging economic web, and as this IT landscape grows increasingly complex, so does the need to efficiently manage IT assets, including both physical assets and data. As a result, individuals and organizations alike are now, more than ever, are recognizing the need to take control of, manage and secure their computer asset base, in order to preserve their IT investments. It becomes more challenging to protect IP assets with the increase in processing power for mobile computing devices, where more and more individuals have opted for mobile computing devices, either as replacements to their desktop units, or as additional devices for home or small business networks.

Most IT departments will support the statement that conventional asset management solutions can't accurately account for the ever-increasing population of remote and mobile users. In fact, a typical organization will lose up to 15% of its PC assets over a two year period due to PC drift—where assets are not necessarily lost or stolen, but they simply cannot be accounted for due to the many times they've changed owners or departments since first being provisioned. On average, most organizations can only accurately identify 65% of their actual PC asset base when asked to do an inventory. Best practices demands that IT know where at least 90% of PC assets are located at all times. In a response to recent corporate accounting scandals, identity theft and malicious hacking, governments are establishing regulations that force businesses to protect and be accountable for all sensitive digital information. If organizations do not effectively identify and track all of their computing assets there could be severe regulatory concerns.

For an asset tracking and/or configuration management application to undertake its tracking function, not only should it be able to resist certain level of tampering by an unauthorized user, it must also be able to accurately identify the physical electronic asset being tracked. Attempts to identify, track, manage and update PC assets and their configurations are further challenged in view of the fact that during a PC's lifecycle it will undergo hardware, software and image changes including: break/fix repairs, configuration changes, operating system reinstalls, hard-drive reformats/replacements, system crashes and user-driven configuration changes. Many of these changes will require a reinstallation of the operating system whereby the original footprint or identification of the PC asset can be disabled or removed. This change, if not diligently recorded and tracked, is the beginning of a PC asset drifting from a known state into an unknown state. These routine PC life cycle operating requirements can increase the complexity and challenge of identifying and tracking PC assets, especially those that are remote and mobile. The challenges in achieving reliable asset identification further create uncertainties in deployment of certain asset control operations, such as undertaking remote data deletion operation to remove sensitive data in a target mobile computer.

Heretofore, some computer assets have been identified by relying on firmware serial numbers. This approach is simple and relatively reliable, but hardware changes could cause misidentification. Other computer assets have been identified by software-assigned identifiers, such as serial numbers and/or names. While this approach is also relatively reliable and the identifiers can be easily assigned, it also creates opportunities for reassignment of the identifiers, such as when the device operating system is reinstalled and/or upon a hardware change, either by an authorized user or by tampering by an unauthorized user.

It is therefore desirable to develop a method for intelligently and accurately determining identification of electronic devices electronically.

SUMMARY OF THE INVENTION

The present invention provides a utility to determine identity of an electronic device electronically, by running a device attribute collection application that collects key attributes in the form of data points of the electronic devices and a device identification application that uses these key data points to link the electronic device to a specific owner or entity. Data points of the device may change over time for reasons such as reconfiguration, repair or normal daily use. The device identification application intelligently tracks changes in key data points associated with the device. Even if the data points change, the device identification application can still identify the device and associate it back to the original owner or entity. This enables consistent tracking of the device over its lifecycle. The device may be identified remotely with the device identification application (e.g., in the event of theft or loss of the device) based on collected data points of the device. The device identification application may be deployed in conjunction with services that may include asset tracking, asset recovery, data delete, software deployment, etc.

In one embodiment, the device attribute collection application and the identification application may be embodied in software, hardware, firmware, or a combination of such.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

Figure 1:
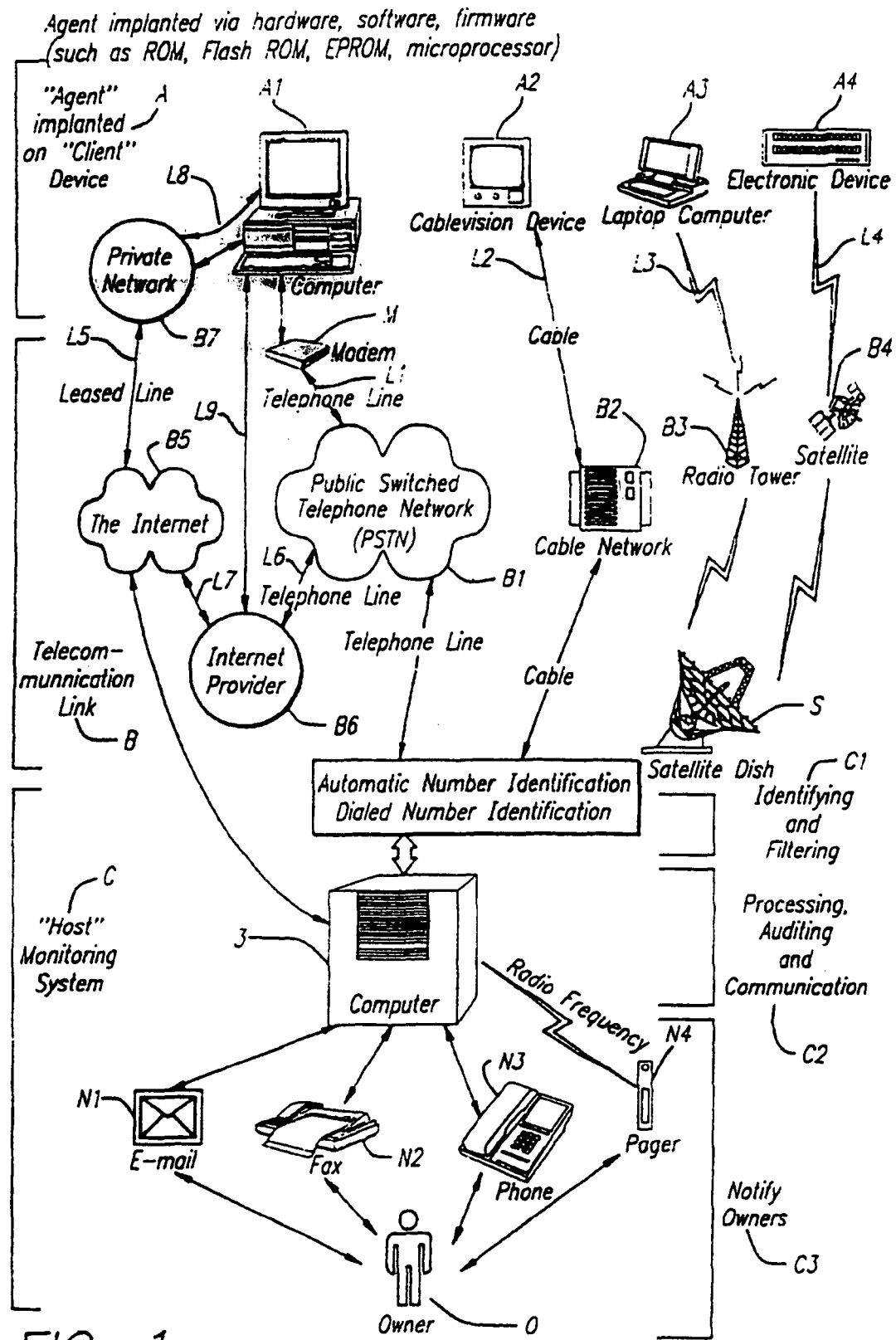
FIG. 1 is a schematic diagram depicting representative communication links including networks by which asset tracking may be implemented in accordance with one embodiment of the present invention.

The present description is of the best presently contemplated mode of carrying out the invention. This description is made for the purpose of illustrating the general principles of the invention and should not be taken in a limiting sense. The scope of the invention is best determined by reference to the appended claims. The present invention can find utility in a variety of implementations without departing from the scope and spirit of the invention, as will be apparent from an understanding of the principles that underlie the invention. For purpose of illustrating the features of the device identification application of the present invention, reference is made to asset tracking as one example of the services in conjunction with which the present invention may be deployed. It is understood that the device identification application may be used for other services, such as computer management, backup and recovery applications, remote data deletion operations, etc., without departing from the scope and spirit of the present invention.

The detailed descriptions that follow are presented largely in terms of methods or processes, symbolic representations of operations, functionalities and features of the invention. These method descriptions and representations are the means used by those skilled in the art to most effectively convey the substance of their work to others skilled in the art. A software implemented method or process is here, and generally, conceived to be a self-consistent sequence of steps leading to a desired result. These steps require physical manipulations of physical quantities. Often, but not necessarily, these quantities take the form of electrical or magnetic signals capable of being stored, transferred, combined, compared, and otherwise manipulated. It will be further appreciated that the line between hardware and software is not always sharp, it being understood by those skilled in the art that software implemented processes may be embodied in hardware, firmware, or software, in the form of coded instructions such as in microcode and/or in stored programming instructions.

Device Identification Overview

The present invention determines identity of the client device by running a device attribute collection application that collects key data points of the electronic devices and a device identification application that uses these key data points to link the electronic device to a specific owner or entity. Data points of the device may change over time for reasons such as reconfiguration, repair or normal daily use. The device identification application intelligently tracks changes in key data points associated with the device. Even if the data points change, the device identification application can still identify the device and associate it back to the original owner or entity. This enables consistent tracking of the device over its lifecycle. The device may be identified remotely with the device identification application (e.g., in the event of theft or loss of the device) based on collected data points of the device. The device identification application may be deployed in conjunction with services that may include asset tracking, asset recovery, data delete, software deployment, etc.

In one embodiment, the device attribute collection application and the device identification application may be embodied in software, hardware, firmware, or a combination of such.

Overview of Embodiment of Deployment of Device Identification Utility

The device identification utility of the present invention may be deployed as a component of existing asset tracking applications. For example, the device identification utility may be deployed as a component of the AbsoluteTrack, a product developed by Absolute Software Corporation, the assignee of the present invention. Absolute Software has developed and is marketing Computrace, a product and service that securely tracks assets and recovers lost and stolen assets, and AbsoluteTrack, a secure asset tracking, and inventory management, solution powered by the Computrace technology platform. Computrace deploys a stealth agent, which is a software client that resides on the hard drive of client computers. Absolute Software Corporation further improved on the original agent platform by providing an improved tamper resistant servicing Agent for enabling, supporting and/or providing various services relating to management and protection of assets (including without limitation hardware, firmware, software, data, etc.), including services such as data delete, firewall protection, data encryption, location tracking, message notification, and software deployment and updates. The servicing functions can be controlled by a remote server. The technology underlying various Computrace products and services have been disclosed and patented in the U.S. and other countries, which patents had been commonly assigned to Absolute Software Corporation. See, for example, U.S. Pat. Nos. 5,715,174; 5,764,892; 5,802,280; 6,244,758; 6,269,392; 6,300,863; and 6,507,914; and related foreign patents. Details of the persistent agent are disclosed in co-pending U.S. patent application Ser. No. 11/093,180, filed Mar. 28, 2005 (now published U.S. Patent Publication No. US2005-0216757; which corresponds to PCT Application Publication No. WO 2006/102399) and U.S. patent application Ser. No. 11/386,040, filed Mar. 20, 2006 (now published U.S. Patent Publication No. US2006-0272020). Further information concerning AbsoluteTrack has been published by Absolute Software Corporation (e.g., AbsoluteTrack—Secure Computer Asset Tracking Solution, a white paper, published Apr. 25, 2003). These documents are fully incorporated by reference as if fully set forth herein.

In one embodiment of the present invention, device data collection and identification may take advantage of the persistent agent, to be deployed as a service by the persistent agent. The device attribute collection application of the present invention may be deployed by or made part of the Agent. Once installed, the device attribute collection application automatically contacts a monitoring center on a regular or scheduled basis transmitting location information and all auto-discovered asset data points. The device identification application of the present invention may be deployed as one of or part of the servicing functions at the remote server. For purpose of completeness, the device identification utility (i.e., data point collection and device identification) of the present invention will be described below in reference to asset tracking function, as elaborated below.

Tracking Function Overview

Asset tracking function is an example of the services that can be enabled with, supported by and/or provided with the device identification application of the present invention. Referring to FIG. 1, the asset tracking system in accordance with one embodiment of the present invention involves a client/server architecture, which may comprise the following main components: (a) client device A consisting of, for example, any one of the electronic devices shown which have been implanted with a persistent Agent. The Agent software runs on the client devices for the purpose of reporting deploying applications including reporting information to and receiving instructions from a remote server to program the Agent to support and execute a desired function. (b) a communication link B, such as an information exchange network, which may include switched communications networks, the Internet, private and public intranet, radio networks, satellite networks, and cable networks; and (c) a host monitoring system C, which include a host monitoring server 3 that monitors the communications between the client device A and the host monitoring system C, which is contacted on a regular or scheduled basis by the client devices records information from the client devices. The monitoring server also provides instructions to the client on what actions to perform, including what actions the client is to perform, what data to collect and the clients next scheduled call time.

In accordance with the present invention, the host monitoring system C is implemented with the device identification application, which remotely determines the identity of the client devices being monitored, by evaluating the data points collected using the device attribute collection application residing in the client devices (e.g., either a separate application or part of the Agent). The client devices contact the monitoring server via the communication link B (e.g., an IP connection or via a dial-up telephone connection). The host monitoring system C may include a reporting and administration portal, which provides customers, administrators and asset tracking service providers the ability to view data and manage the functions of the monitoring server and the client devices.

With the exception of the device identification application, each of these components has been fully disclosed in the copending U.S. patent application Ser. No. 11/386,040, filed Mar. 20, 2006 (now U.S. Patent Application Publication No. US2006-0272020; which corresponds to PCT Application Publication No. WO 2006/102399).

Referring to FIG. 1, useful client devices A that can be identified with the device identification application in accordance with the present invention (and in which the persistent servicing Agent can be implemented) include, but are not limited to, general or specific purpose digital processing, information processing and/or computing devices, which devices may be standalone devices or a component part of a larger system (e.g., a mass storage device), portable, handheld or fixed in location. Different types of client devices may be in the form of desktop client computing devices, portable computing devices (e.g., laptop and notebook computers), or hand-held devices (e.g., cell phones, PDAs (personal digital assistants)), personal electronics (e.g., personal digital media players, personal gaming devices), etc.), which have the ability to communicate to an external server, as further explained below. The client devices may be selectively operated, activated or configured by a program, application, routine and/or a sequence of instructions and/or logic stored in the devices, in addition to the operating systems resident in the devices. In short, use of the methods described and suggested herein is not limited to a particular processing configuration. By way of example and not limitation, the present invention is described in reference to examples of deployments and implementations in reference to a laptop or notebook computer as the client device A (computer A1 is schematically represented as a desktop device, but may instead comprise a portable computing device). FIG. 1 is a schematic representation of the communication links B in the form of information exchange networks in which the present invention may be deployed for asset identification and tracking. The information exchange network accessed by the device identification application in accordance with the present invention may involve, without limitation, distributed information exchange networks, such as public and private computer networks (e.g., Internet, Intranet, WAN, LAN, etc.), value-added networks, communications networks (e.g., wired or wireless networks), broadcast networks, cable networks, radio networks, and a homogeneous or heterogeneous combination of such networks. As will be appreciated by those skilled in the art, the networks include both hardware and software and can be viewed as either, or both, according to which description is most helpful for a particular purpose. For example, the network can be described as a set of hardware nodes that can be interconnected by a communications facility, or alternatively, as the communications facility, or alternatively, as the communications facility itself with or without the nodes. It will be further appreciated that the line between hardware, firmware and software is not always sharp, it being understood by those skilled in the art that such networks and communications facility, and the components of the persistent agent technology platform, involve software, firmware and hardware aspects.

In the co-pending U.S. patent application Ser. No. 11/386,040, one of the important functions of the Agent is to contact the host monitoring system C to report information relating to its associated client device A. The present invention provides an improvement to the earlier embodiments. According to one embodiment disclosed therein, each client device A has attributes that are collected and delivered by the client device A to the host monitoring station C. The present invention provides a further means of identifying the identity of the tracked client device, without solely relying on the device identification number(s) assigned, by providing an application to determine identity of the client device electronically using such attributes.

Device Identification Utility

The general approach includes:
1) Attribute collection.
2) Collected attributes transmitted to the server (optionally with optimization to only upload them if the CRC for the XML document has changed), and inventory record maintained.
3) ESN (Electronic Serial Number) assignment process and storage of changed attributes.
4) Optionally storing the extended history of the attribute changes.

a. Device Attribute Collection Application

The present invention determines identity of the client device by running a device attribute collection application that collects key data points of the electronic devices. The device identification application (e.g., residing at a remote server) considers these key data points to link the electronic device to a specific owner or entity. For example, the device attribute collection application may be embodied as a service enabled and supported by the persistent agent, in accordance with one embodiment of the present invention. The device identification scheme according to the present invention would be less susceptible to malicious tampering attempts to mask the device identity.

In one embodiment, the data is gathered and delivered when the persistence agent calls the monitoring server.

Figure 4:
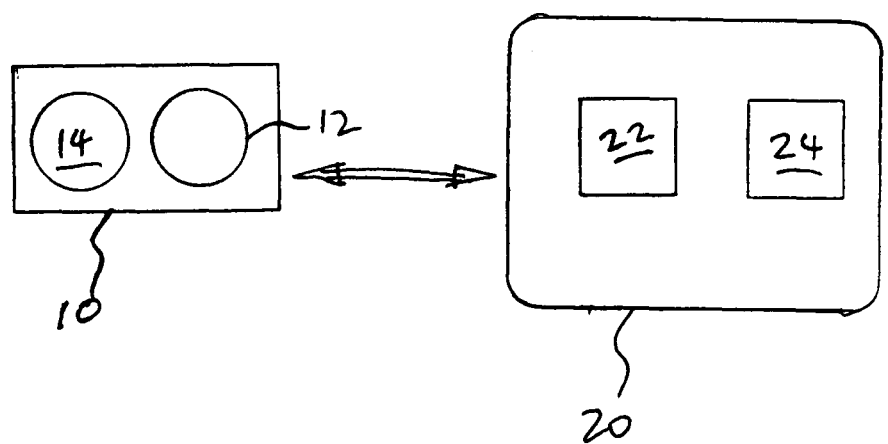
FIG. 4 is a schematic block diagram illustrating the interaction between a device and a server, to undertake device data collection and identification.

Referring to FIG. 4, in one embodiment, during the call, a specific device attribute collection application program 12 (e.g., in the form of a DLL (dynamic link libraries)) is downloaded from a server 20 into a memory in the device 10 by the agent therein, and the agent invokes a function in this inventory DLL. This application gathers the data points (e.g., using the mechanisms listed on the right column of Table 1 below). The DLL is not limited by the mechanisms listed; it can be extended to include additional mechanisms as may be available in standard API's (Application Program Interfaces) or custom built to collect existing data points more reliably or to collect additional data points. (Alternatively, the device attribute collection application may be deployed in the server, to remotely obtain device attributes.) The data points collected and applied to device identification may include the following:

1. Device's Make, Model
    ii. Device's Motherboard Serial Number
    iii. Device's UUID (Universal Unique Identifier)
    iv. Hard drive Serial Number
    v. Mac address of multiple network cards
    vi. Ram serial number
    vii. Battery Serial number The list above is an example of a subset of data points collected during the interaction with a device. An embodiment of a full list of data collected and to be stored as an inventory record by the device identification application at the server is included in Table 1 below, for a computer as an example of a device being tracked. Also listed in Table 1 are the respective mechanisms to collect these data by the device attribute collection application.

TABLE 1

Full list of Data points collected and stored in an inventory record.

| Data Point | Data Gathering Mechanism |
|---|---|
| ComputerMakeWMI | WMI API |
| ComputerModelWMI | WMI API |
| ComputerSerialWMI | WMI API |
| ComputerMake | MAPMEM driver; Read DMI info |
| ComputerModel | MAPMEM driver; Read DMI info |
| ComputerSerial | MAPMEM driver; Read DMI info |
| ComputerAsset0 | WMI API |
| ComputerAsset1 | WMI API |
| SystemSMBIOSVersion | Windows Registry |
| SystemBiosVersion | Windows Registry |
| SystemBiosDate | Windows Registry |
| BaseBoardVersion | WMI API |
| HDDSerialNumber0 | S.M.A.R.T API |
| HDDSerialNumber1 | S.M.A.R.T API |
| HDDSerialNumber2 | S.M.A.R.T API |
| HDDSerialNumber3 | S.M.A.R.T API |
| ComputerName | WIN API |
| MACAddress0 | SNMP, if fails NetBIOS |
| MACAddress1 | SNMP, if fails NetBIOS |
| OSProductKey | From "encrypted" MS value in registry |
| IBMComputraceStatus | Computrace driver |
| BatteryDeviceID | WMI API |
| ComputerUUID | MAPMEM driver; Read DMI info |
| GatewayString0 | MAPMEM driver; Read DMI info |
| GatewayString1 | MAPMEM driver; Read DMI info |
| GatewayString2 | MAPMEM driver; Read DMI info |
| DELLCTStatus | Computrace driver |
| DELLInterfaceStatus | Computrace driver |
| RAMSerialNumber | WMI API |
| Inventory Version # | Inserted by Inventory DLL |

It is noted that MAPMEM driver (e.g., developed by Absolute) may only be required if serial number is less than a minimum number of characters (e.g., five characters,) or WMI call fails. Otherwise information from WMI may be used instead. Should S.M.A.R.T API fails (i.e., SN is returned empty), WMI may be used to get HDDSerialNumber. Some of the data points may be specific for certain makes and/or models of devices (e.g., GatewayString data is specific for GATEWAY brand of computers only).

b. Inventory Record for Device Identification

During each interaction with the persistent agent, an inventory record is created with this data by the device identification application. The inventory record is a record of all specific data points collected at one instance that constitutes a device's unique identification or characteristics (e.g., an embodiment of an inventory record is show in Table 1). These inventory records are logged to create a history of the asset's key data points. The function to identify the device would be enhanced by using these additional data points, as they provide a more comprehensive and dynamic profile of the device (i.e., accommodating continuous changes to the device over the life history of the device), which can be tracked over the device's life history.

Referring to FIG. 4, in one embodiment, DLL creates a file in XML format that is uploaded to the server 20 (or another server different from the server 20) and parsed into the database to form an inventory record. The server 20 includes a device identification application 22, which receives the XML file from the device attribute collection application 12 residing in the device 10. New and existing inventory records may be stored in an inventory record database 24. The format of the XML file is shown by a sample in Table 2.

TABLE 2

Sample XML file with inventory data

```
<?xml version="1.0" encoding="UTF-8" ?>
-<CT:data version="1.00"
xmlns:CT="http://www.absolute.com/atinfo/persistence">
-<CT:section name="MachineInfo">
  <CT:setting name="ComputerMakeWMI"
  value="DELL COMPUTER CORPORATION~INTEL
        CORPORATION~DELL COMPUTER CORPORATION" />
  <CT:setting name="ComputerModelWMI"
  value="XPST500~SE440BX-3~" />
  <CT:setting name="ComputerSerialWMI"
  value="~0005335T1246196D021X~" />
  <CT:setting name="ComputerMake"
  value="DELL COMPUTER CORPORATION~INTEL
        CORPORATION~DELL COMPUTER CORPORATION" />
  <CT:setting name="ComputerModel"
  value="XPST500~SE440BX-3~" />
  <CT:setting name="ComputerSerial"
  value="~0005335Ti246196D021X~" />
  <CT:setting name="ComputerAsset0" value="1REW5" />
  <CT:setting name="ComputerAsset1" value="" />
  <CT:setting name="SystemSMBIOSVersion" value="" />
  <CT:setting name="SystemBiosVersion" value="" />
  <CT:setting name="SystemBiosDate" value="04/22/99" />
  <CT:setting name="BaseBoardVersion" value="" />
  <CT:setting name="HDDSerialNumber0" value="F3H8X5VC" />
  <CT:setting name="HDDSerialNumber1" value="" />
  <CT:setting name="HDDSerialNumber2" value="" />
  <CT:setting name="HDDSerialNumber3" value="" />
  <CT:setting name="ComputerName"
  value="FRANK-S10XQAIFU" />
  <CT:setting name="MACAddress0" value="0080C6F1FD17" />
  <CT:setting name="MACAddress1" value="005345000000" />
  <CT:setting name="OSProductKey"
  value="DJP4J-WQMCC-X7DGK-W9WBV-XF3CG" />
  <CT:setting name="IBMComputraceStatus"
  value="FFFFFFFF" />
  <CT:setting name="BatteryDeviceID" value="" />
  <CT:setting name="InventoryVersion" value="1.0" />
  <CT:setting name="ComputerUUID" value="" />
  <CT:setting name="GatewayString0" value="" />
```

TABLE 2-continued

Sample XML file with inventory data

```
<CT:setting name="GatewayString1" value="" />
<CT:setting name="GatewayString2" value="" />
<CT:setting name="DELLCTStatus" value="00000000" />
<CT:setting name="DELLInterfaceStatus"
value="FFFFFFFF" />
<CT:setting name="RAMSerialNumber" value="" />
  </CT:section>
  </CT:data>
```

The data point collection application is configured to use these key data points in the inventory records, match it with data that is reported during the agent call, and link the device to a specific owner or entity. Data points of the device change over time for reasons such as reconfiguration, repair or normal maintenance. The application intelligently handles changes in key data points. Even if the data points change, the application can still identify the device and link it back to the original owner or entity. This enables consistent tacking of the device over its lifecycle. In case of theft or loss, the device can be identified remotely with software. The details of the device identification application are described below.

c. Device Identification Application

Figure 2:
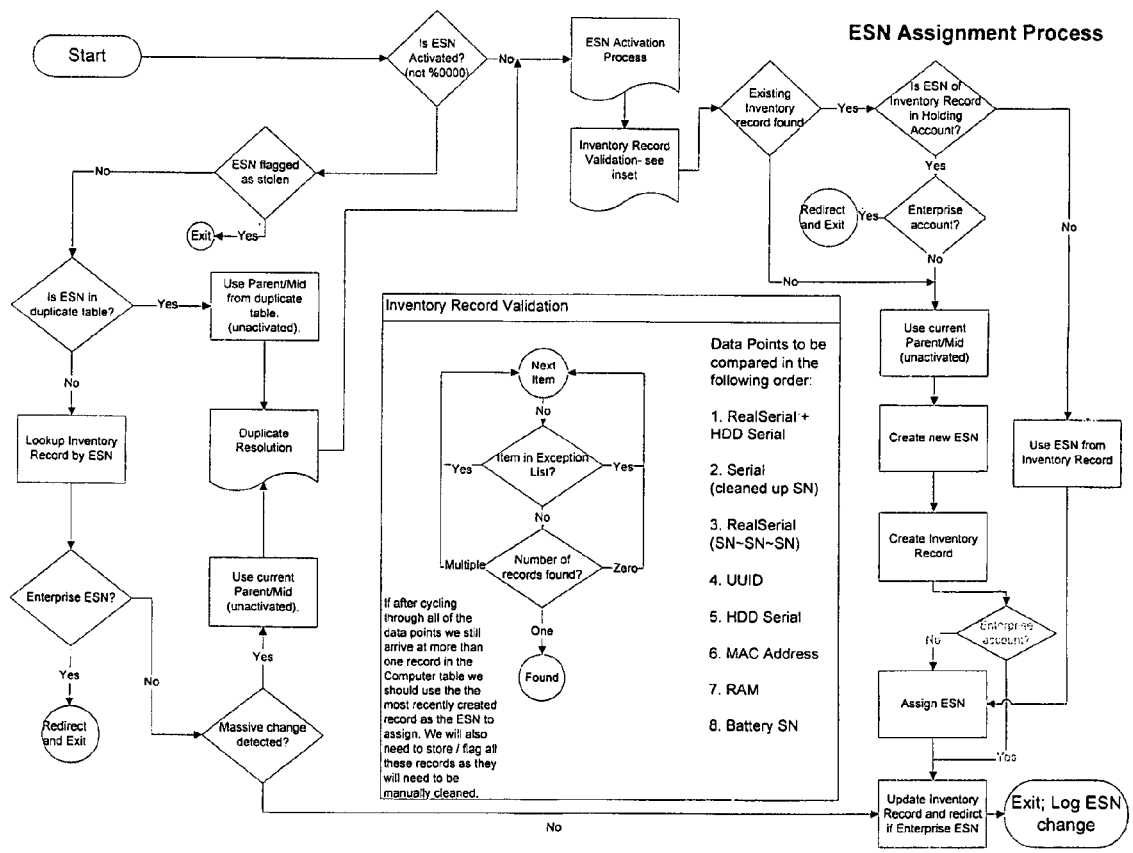
FIG. 2 is a schematic functional block diagram illustrating logic flow of processes undertaken by the device identification application, in accordance with one embodiment of the present invention.

FIG. 2 is a functional block diagram illustrating the logic flow of the device identification application 22 residing at, for example, a monitoring server 20 in FIG. 4. The application performs at least the following primary functions:

i. matching the key data points gathered from the device to the unique identifier number (e.g., Electronic Serial Number—ESN) assigned to the device.
 ii. handles new devices to create a baseline inventory record.
 iii. recognizing the device after subsequent changes in hardware components.

On an initial contact with a new device, an inventory record is created and a unique identifier (ESN) is assigned in the inventory record database 24 and also written on the device hard drive 14. On subsequent contacts, the ESN written on the device hard drive is matched to the inventory record in the inventory record database 24, and the other key data points are updated. When an agent contacts the monitoring server 20, the device attribute collection application 12 (e.g., an inventory DLL) is run to collect the inventory data, and an ESN, if that may have been previously written on the device hard drive 14, is retrieved. Below are possible scenarios.

1. ESN Assignment

If an ESN has not been assigned to the computer (i.e., the last 4 digits are 0's), (or if an earlier assigned ESN is misidentified, e.g., as a result of tampering), it means that either it is a new installation, or the hard drive has been wiped and the persistence algorithm from BIOS has restored the agent. If ESN assignment is needed, the right hand side of the flow diagram in FIG. 2 is undertaken, and an ESN activation process is executed. For example, in case of a stolen device, the ESN written on the hard drive my have been erased or tampered with, so a reverse lookup is done using the key data points and an ESN is found and re-written to the hard drive. This reverse lookup is also used to match the device to its rightful owner. In connection with the ESN activation process, using the data points collected by the device attribute collection application, the inventory record is validated against the existing inventory records stored in the inventory record database 24. According to the embodiment illustrated in the Inventory Record Validation insert in FIG. 2, the following device data points by the current attribute collection process are matched against those in the previously stored inventory records in the following order, for example:

i. RealSerial+HDDSerial
 ii. Serial number (if the serial numbers for particular makes/models are poorly formatted, reformatting of the serial number may be undertaken)
 iii. RealSerial (SN~SN~SN; BIOS-motherboard-system enclosure serial number)
 iv. UUID
 v. HDD Serial
 vi. MAC address
 vii. RAM serial number
 viii. Battery serial number Specifically, prior to matching the data points, an exception table is looked up to see if the data point is in the exception table. This is to ensure known non-unique data points are not used in ESN determination. Some generic no-name devices are known to have either blank serial numbers or a non-unique serial number that exists on multiple devices. A list of these known non-unique identifiers is maintained in the exception table. If there is an exception, the data point is ignored, and the next item of data point is matched. If a particular data point item is not on the exception list, a determination is made as to how many existing inventory records are found having such data point item. If instead no existing inventory record or multiple existing inventory records are found, that particular data point item is ignored and the next item matched. Any multiple records found in the process may be "cleaned" to remove or reduce issues for future inventory record validation. If only one existing inventory record is found, then the inventory record corresponding to the collected data point item is deemed to be found and a match of the device in relation to such existing inventory record is deemed to have been achieved. The ESN of the existing inventory record is checked to determine if it is in a holding account. If not in the holding account, such ESN is assigned to the device (e.g., written to the device hard-drive) and the inventory record for the device is updated. If in a holding account, and if it is an account that has been pre-designated to be monitored by a specific host monitoring center (e.g., an enterprise account managed by an associated monitoring center), the client device is instructed to call back to that monitoring center. If not an enterprise account, the current Parent (i.e., ID which can be used to identify the account into which an ESN should be assigned) and MID (i.e., media ID; unique identifier assigned when the installation media is created) are used to create a new ESN (i.e., "Parent"+MID become the prefix for the new ESN).

If instead no unique existing inventory record or multiple existing inventory records are found after all the device data point items had been checked during the inventory record validation process, then the most recently created inventory record (i.e., the one comprising the currently collected device attributes) for purpose of ESN assignment. The current Parent and MID are used to create a new ESN (i.e., "Parent"+MID become the prefix for the new ESN).

Once the new ESN has been created in accordance with either of the above logic flow, a new inventory record is created. If not an enterprise account, the new ESN is assigned to the device and the inventory record database is updated. If an enterprise account, the device is redirected to contact the associated or designated server for further handling.

2. Existing Device ESN—Validation

In the case where the calling agent provides an existing ESN (i.e., the last 4 digits are not 0's) that was retrieved from the device (e.g., stored on the device hard drive), the device can already be uniquely identified (unless it is an invalid ESN, in which case it would be treated as though an ESN does not exist, and the earlier described ESN assignment process is undertaken). In this case, the application checks for validity of the ESN. The ESN on the hard drive can be invalid for a number of reasons, such as:

i. The device has an image of another device on the hard drive. Some IT departments create a master system, create a software image of the master systems and deploy these images on multiple devices.

ii. A hard disk has been swapped from one device to another, during normal maintenance activities. These problems can be automatically detected and resolved.

The application first checks if the calling agent has an activated (non zero) ESN. If yes, the ESN is searched to see if it is stolen. This is because the calling device's ESN is not reassigned or changed if it is stolen, to retain the consistency and to keep the historical tracking history intact. If the ESN is not flagged stolen, then a known duplicate list is searched for automatic resolution. This may include assigning a new ESN to one or both of the duplicate records, for example using the ESN activation process earlier described.

3. Massive Change

If activated ESN is calling and the stolen/duplicate checks did not flag the device as being stolen, then the inventory record of the ESN in the inventory record database is matched with the inventory record created based on device data points collected during the current contact. (For enterprise ESN, the device is redirected, as noted above.) If less than a predetermined number of data points (e.g., two or less) have changed, then the inventory record in the inventory record database is updated for checks during subsequent contacts. This process distinguishes routine maintenance activities if the number of changes detected in a single contact is within the predetermined number, from massive changes if the number of changes in a single contact is more than the predetermined number. In this example, if three or more data points are different between the recorded inventory record and calling data points, then a 'massive change' situation is triggered, where the ESN is not considered valid. This is because enough data points are different that it cannot be considered the same device. It is assumed that either the ESN on the device was duplicated or otherwise tampered with, or substantial maintenance on the device took place, and the original constituent parts are considered to be the original device, and thus to be a new device.

Figure 3:
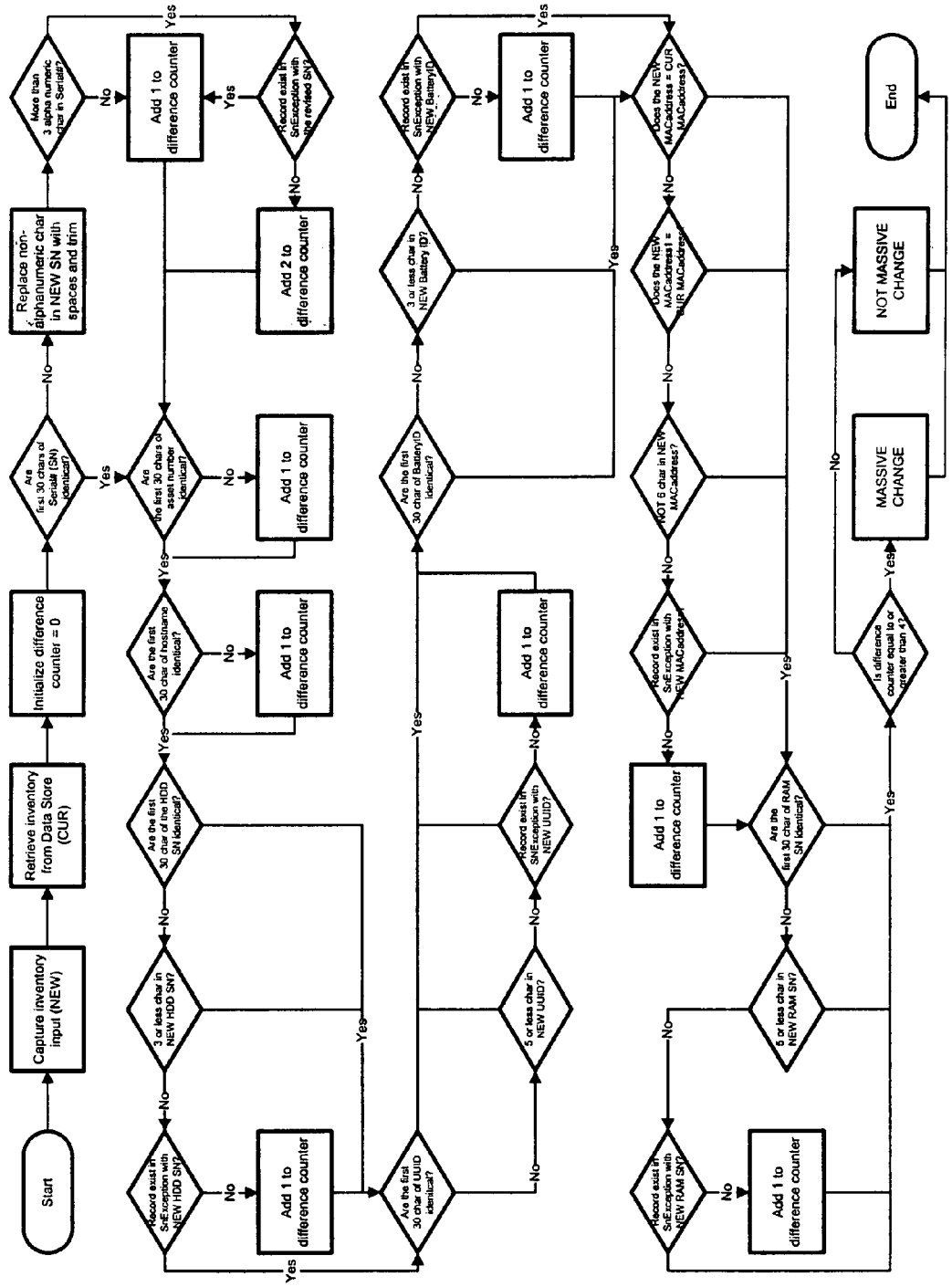
FIG. 3 is a schematic functional block diagram illustrating logic flow of processes undertaken in determining massive change in the data points of a device.

FIG. 3 is a schematic function block diagram illustrating the processes undertaken to implement massive change determination, in accordance with one embodiment of the present invention. Various checks are undertaken to determine the number of data points of the device (e.g., those discussed earlier above) have experienced changes. A difference counter keeps track of the number of data points that have changed, by incrementing from an initial zero count. In the illustrated embodiment, if the difference counter has a value that is equal or greater than "2" (or some other threshold value), massive change status is determined to have occurred.

In this scenario, the application treats it as a new device, and assigns it a new ESN from the same customers account. In this case, the application switches to the right hand side of the logic flow diagram, and the ESN activation process earlier described is undertaken.

4. Exit

At the logical exit of the processes illustrated in FIG. 2, the inventory record in the inventory record database matches the data points collected during that contact, and the ESN in the inventory record database matches the ESN written on the device hard drive. This repositions the device for future inventory record checking, which may be according to a predetermined schedule, such as that described in the patent publications identified herein regarding asset tracking. At this point, the inventory record may be relied upon to link the client device to its owner (an individual or entity), for example based on prior established owners information in relation to the inventory records stored in the inventory record database.

5. Further Enhancements

The embodiment described above effectively and uniquely identifies a device. The logic described above can be extended to include more data points, to collect data points using different mechanism, and using varying matching mechanisms, not limited to the application processes and data described above, without departing from the scope and spirit of the present invention. Hence the device identification application of the present invention should be considered extensible and not bound by the specific algorithms, data points, data collection mechanism or usage of specific limited number of data points by the application.

Data points of the device may change over time for reasons such as reconfiguration, repair or normal daily use. The device identification application intelligently tracks changes in key data points associated with the device. Even if the data points change, the device identification application can still identify the device and associate it back to the original owner or entity. This enables consistent tracking of the device over its lifecycle. The device may be identified remotely with the device identification application (e.g., in the event of theft or loss of the device). The device identification application may be deployed in conjunction with services that may include asset tracking, asset recovery, data delete, software deployment, etc.

The process and system of the present invention has been described above in terms of functional modules in block diagram format. It is understood that unless otherwise stated to the contrary herein, one or more functions may be integrated in a single physical device or a software module in a software product, or one or more functions may be implemented in separate physical devices or software modules at a single location or distributed over a network, without departing from the scope and spirit of the present invention.

It is appreciated that detailed discussion of the actual implementation of each module is not necessary for an enabling understanding of the invention. The actual implementation is well within the routine skill of a programmer and system engineer, given the disclosure herein of the system attributes, functionality and inter-relationship of the various functional modules in the system. A person skilled in the art, applying ordinary skill can practice the present invention without undue experimentation.

While the invention has been described with respect to the described embodiments in accordance therewith, it will be apparent to those skilled in the art that various modifications and improvements may be made without departing from the scope and spirit of the invention. For example, the information extraction application can be easily modified to accommodate different or additional processes to provide the user additional flexibility for web browsing. Accordingly, it is to be understood that the invention is not to be limited by the specific illustrated embodiments, but only by the scope of the appended claims.

The invention claimed is:

1. A method of determining identity of an electronic device, comprising:
   obtaining, using an attribute collection application residing at the electronic device, a plurality of data points of the electronic device;
   searching, using a device identification application residing at a remote server, existing records of a plurality of electronic devices to identify a unique record corresponding to the electronic device, by:
   looking up a first data point of the plurality of data points, in an exception table of blank and non-unique data points;
   determining that the first data point is not in the exception table;
     when the first data point is not in the exception table, determining how many records have the first data point;
     when only one record has the first data point, deeming the one record to be the unique record; and
     when no or multiple records have the first data point, determining whether there is only one record having a second data point in the plurality of data points, and, when there is, deeming the record having the second data point to be the unique record;
   writing an identifier from the unique record to the electronic device, or, when there is no unique record, creating a unique record corresponding to the electronic device and writing an identifier corresponding to the unique record to the electronic device;
   subsequently, obtaining the plurality of data points and the identifier from the electronic device using the attribute collection application, and then searching the existing records of the plurality of electronic devices based on the identifier using the device identification application to subsequently identify the unique record corresponding to the electronic device, wherein:
     the device identification application determines the identity of the electronic device from the unique record when it determines that less than a predetermined number of subsequently obtained data points are different from corresponding data points in the unique record; or
     the device identification application determines the electronic device to be a new electronic device when the predetermined number of subsequently obtained data points are different, and assigns a new identifier to the new electronic device.

2. The method of claim 1, further comprising the step of communicating the plurality of data points to the remote server.

3. The method as in claim 1, wherein the identifier comprises an Electronic Serial Number (ESN).

4. The method as in claim 1, wherein the a unique record is subsequently identified by matching the plurality of subsequently obtained data points against corresponding data points stored in the existing records for the plurality of electronic devices.

5. The method of claim 1, wherein the plurality of data points include data points relating to hardware and/or software deployed in the electronic device.

6. The method of claim 5, wherein the data points include at least two of:
   i. Device Make and/or Model;
   ii. Device Motherboard Serial Number;
   iii. Device UUID (Universal Unique Identifier);
   iv. Hard drive Serial Number;
   v. MAC address of multiple network cards;
   vi. RAM serial number; and
   vii. Battery Serial number.

7. The method of claim 5, wherein the a unique record is subsequently identified by matching each subsequently obtained data point in sequence, against corresponding data points stored in the existing records.

8. The method as in claim 1, further comprising linking the electronic device to a specific owner or entity upon subsequently identifying that the electronic device is that of the unique record.

9. The method as in claim 1, further comprising, when no or multiple records have said first data point, and prior to determining that there is only one record having said second data point, the device identification application:
   looking up said second data point in the exception table; and
   determining that said second data point is not in the exception table.

10. An electronic device comprising:
   a processor;
   a memory communicatively coupled to the processor, wherein the memory stores process-executable instructions, which on execution, cause the processor to run an attribute collection application interacting with hardware and/or software of the electronic device, wherein the hardware includes a data storage device, motherboard, BIOS, memory and network interface, and wherein the attribute collection application:
   collects a plurality of data points including data points relating to the hardware and/or software;
   transmits the data points to a remote server to identify a unique record corresponding to the electronic device, by:
     searching existing records of a plurality of electronic devices using an identification application residing at the remote server;
   looking up a first data point of the plurality of data points, in an exception table of blank and non-unique data points;
   determining that the first data point is not in the exception table;
     when the first data point is not in the exception table, determining how many records have the first data point;
     when only one record has the first data point, deeming the one record to be the unique record; and
     when no or multiple records have the first data point, determining whether there is only one record having a second data point in the plurality of data points, and, when there is, deeming the record having the second data point to be the unique record;
   receives, from the server, an identifier from the unique record, or, when there is no unique record, an identifier from a unique record newly created by the remote server corresponding to the electronic device;
   writes the identifier to the electronic device; and
   subsequently, transmits to the remote server the plurality of data points and the identifier from the electronic device, wherein the remote server then searches the existing records of the plurality of electronic devices based on the identifier using the device identification application to subsequently identify the unique record corresponding to the electronic device, wherein:
the device identification application determines the identity of the electronic device from the unique record when it determines that less than a predetermined number of subsequently obtained data points are different from corresponding data points in the unique record; or
the device identification application determines the electronic device to be a new electronic device when the predetermined number of subsequently obtained data points are different, and assigns a new identifier to the new electronic device.

11. A system for remotely determining the identity of an electronic device connected to a network, comprising:
an electronic device comprising hardware and/or software, wherein the hardware includes a data storage device, motherboard, BIOS, memory and network interface; and
an attribute collection application interacting with the hardware and/or software, wherein the attribute collection application:
collects a plurality of data points including data points relating to the hardware and/or software; and
transmits the data points to a remote server to identify a unique record corresponding to the electronic device;
wherein the remote server is connected to the network, comprising a device identification application, which is structured and configured to:
receive the plurality of data points from the attribute collection application at the electronic device;
search existing records of a plurality of electronic devices to identify, based on the plurality of data points, a unique record corresponding to the electronic device, by:
looking up a first data point of the plurality of data points, in an exception table of blank and non-unique data points;
determining that the first data point is not in the exception table;
when the first data point is not in the exception table, determining how many records have the first data point;
when only one record has the first data point, deeming the one record to be the unique record; and
when no or multiple records have the first data point, determining whether there is only one record having a second data point in the plurality of data points, and, when there is, deeming the record having the second data point to be the unique record; and
transmit to the electronic device an identifier from the unique record, or, when there is no unique record, an identifier from a unique record newly created by the remote server corresponding to the electronic device;
wherein the electronic device receives the identifier from the remote server and writes the identifier to the electronic device,
wherein the electronic device subsequently transmits to the remote server the plurality of data points and the identifier from the electronic device, and
wherein the remote server then searches the existing records of the plurality of electronic devices based on the identifier using the device identification application to subsequently identify the unique record corresponding to the electronic device, wherein:
the device identification application determines the identity of the electronic device from the unique record when it determines that less than a predetermined number of subsequently obtained data points are different from corresponding data points in the unique record; or
the device identification application determines the electronic device to be a new electronic device when the predetermined number of subsequently obtained data points are different, and assigns a new identifier to the new electronic device.

12. A server for remotely identifying an electronic device connected to a network, comprising:
a processor;
a memory communicatively coupled to the processor, wherein the memory stores process-executable instructions, which on execution, cause the processor to run an identification application, to:
receive a plurality of data points from an attribute collection application residing at the electronic device, the plurality of data points including data points relating to hardware and/or software deployed in the electronic device, wherein the hardware includes a data storage device, motherboard, BIOS, memory and network interface;
search existing records of a plurality of electronic devices to identify, based on the plurality of data points, a unique record corresponding to the electronic device, by:
looking up a first data point of the plurality of data points, in an exception table of blank and non-unique data points;
determining that the first data point is not in the exception table;
when the first data point is not in the exception table, determining how many records have the first data point;
when only one record has the first data point, deeming the one record to be the unique record; and
when no or multiple records have the first data point, determining whether there is only one record having a second data point in the plurality of data points, and, when there is, deeming the record having the second data point to be the unique record;
transmit to the electronic device an identifier from the unique record, or, when there is no unique record, an identifier from a unique record newly created by the remote server corresponding to the electronic device; and
subsequently, obtain the plurality of data points and the identifier from the attribute collection application in the electronic device, and then search the existing records of the plurality of electronic devices based on the identifier using the identification application to subsequently identify the unique record corresponding to the electronic device, wherein:
the identification application determines the identity of the electronic device from the unique record when it determines that less than a predetermined number of subsequently obtained data points are different from corresponding data points in the unique record; or
the identification application determines the electronic device to be a new electronic device when the predetermined number of subsequently obtained data points are different, and assigns a new identifier to the new electronic device.

13. The server as in claim 12, wherein the identification application is further configured, when no or multiple records have said first data point, and prior to determining that there is only one record having said second data point, to:
   look up said second data point in the exception table; and
   determine that said second data point is not in the exception table.

* * * * *